US011995939B2

(12) United States Patent
Martínez Chavoy et al.

(10) Patent No.: US 11,995,939 B2
(45) Date of Patent: May 28, 2024

(54) BANKNOTE GUIDING DEVICE

(71) Applicant: AZKOYEN, S.A., Peralta (ES)

(72) Inventors: Álvaro Martínez Chavoy, Peralta (ES); Jesús Aguado Vitas, Peralta (ES); Sergio Díaz Pérez, Peralta (ES); José Manuel Navarro Cueva, Peralta (ES); Miguel Angel Calleja Lafuente, Peralta (ES)

(73) Assignee: AZKOYEN, S.A., Peralta (Navarra) (ES)

( * ) Notice: Subject to any disclaimer, the term of this patent is extended or adjusted under 35 U.S.C. 154(b) by 417 days.

(21) Appl. No.: 17/186,833

(22) Filed: Feb. 26, 2021

(65) Prior Publication Data

US 2021/0272407 A1 Sep. 2, 2021

(30) Foreign Application Priority Data

Feb. 28, 2020 (EP) .................................... 20382144

(51) Int. Cl.
*G07D 11/18* (2019.01)
*B65H 29/58* (2006.01)

(52) U.S. Cl.
CPC ............. *G07D 11/18* (2019.01); *B65H 29/58* (2013.01); *B65H 2404/632* (2013.01); *B65H 2701/1912* (2013.01); *G07D 2211/00* (2013.01)

(58) Field of Classification Search
CPC ........... G07D 11/18; B65H 29/58; B65H 5/36
See application file for complete search history.

(56) References Cited

U.S. PATENT DOCUMENTS

| | | | | |
|---|---|---|---|---|
| 11,749,050 | B2 * | 9/2023 | Chou | G07D 11/235 271/9.13 |
| 2003/0057642 | A1 | 3/2003 | Baker et al. | |
| 2015/0194004 | A1 | 7/2015 | Sackfield | |
| 2018/0040189 | A1 | 2/2018 | Chang et al. | |

FOREIGN PATENT DOCUMENTS

| | | | | |
|---|---|---|---|---|
| CN | 103449231 | A * | 12/2013 | B65H 29/58 |
| EP | 2669226 | A2 * | 12/2013 | B65H 29/58 |
| GB | 2521402 | A | 6/2015 | |
| WO | 2007101880 | A2 | 9/2007 | |
| WO | 2007101880 | A3 | 9/2007 | |
| WO | WO-2007101880 | A2 * | 9/2007 | B65H 29/58 |
| WO | 2013104696 | A1 | 7/2013 | |
| WO | 2015032184 | A1 | 3/2015 | |
| WO | WO-2020157893 | A1 * | 8/2020 | B65H 29/58 |

* cited by examiner

*Primary Examiner* — Patrick Cicchino
(74) *Attorney, Agent, or Firm* — Hamilton, Brook, Smith & Reynolds, P.C.

(57) ABSTRACT

The banknote guiding device comprises a first, second and third guide assemblies, each guide assembly being rotatory to be placed in either a first or second position for the guiding of banknotes into channels, wherein the first and second guide assemblies are rotary about a first rotation axis, and the third guide assembly is rotary around a second rotation axis. It provides a banknote guiding device that is as simple as possible while minimizing the gaps between the guide assemblies to avoid banknote jams during travel.

9 Claims, 4 Drawing Sheets

BANKNOTE GUIDING DEVICE

RELATED APPLICATION

This application claims priority under 35 U.S.C. § 119 or 365 to Europe, Application No. 20382144.2, filed Feb. 28, 2020. The entire teachings of the above application is incorporated herein by reference.

BACKGROUND

The present invention refers to a banknote guiding device, which permits to direct or guide a banknote along a desired displacement path.

Cash machines and ATMs handle incoming and outgoing banknotes. Incoming banknotes are entered by users, for example, to pay for a purchased item or to make a deposit into their account, and outgoing banknotes are dispensed to the user to provide change at a cash machine or to provide the requested money at an ATM.

Therefore, the banknotes must be directed to different areas of the machine according to their authentication, condition, etc. and according to the functionality that the machine is performing at each moment: collection, payment, return, storage in recyclers, storage in stackers, etc.

To determine the displacement path that banknotes must follow, cash machines and ATMs include banknote guiding devices.

These conventional guiding devices usually comprise three guide assemblies that can be placed in two alternative positions for guiding the banknotes.

An example of this type of banknote guiding device is disclosed in US 2018/0040189 A1.

This document discloses a transport path switching module comprising a switching mechanism. This switching mechanism comprises three guide assemblies mounted in a central body, and each guide assembly is rotary around an axis, so that three rotation axes are defined. By having to rotate each guide assembly about a different axis, this device is complex.

Another example of this type of guiding device is described in WO 2013104696 A1, which describes a banknote diverter that defines a single rotation axis about which three guide assemblies pivot.

This arrangement around a single rotation axis has the disadvantage that it forces the longitudinal dimension of the axis to be distributed over the three guide assemblies. As the banknotes are moved by leaning on the guide assemblies, this arrangement does not minimize the gaps or holes between the guide assemblies, so it is easier for the banknotes to get jammed in the gaps.

SUMMARY

Therefore, an objective of the present invention is to provide a banknote guiding device which is as simple as possible and which, at the same time, minimizes the gaps between the guide assemblies to avoid jamming of the banknotes during their movement.

With the guiding device of the invention, the above-mentioned disadvantages are solved, presenting other advantages that will be described below.

The banknote guiding device in accordance with the present invention comprises a first, second and third guide assemblies, each guide assembly being rotary to be placed in a first or second position for guiding the banknotes to channels, which are preferably bi-directional, wherein the first and second guide assemblies are rotary about a first rotation axis, and the third guide assembly is rotary about a second rotation axis.

Advantageously, this second rotation axis is mounted on the first guide assembly.

Also advantageously, each guide assembly comprises a plurality of blades placed along their respective rotation axis.

According to a preferred embodiment, the blades of the first guide assembly are arranged between the blades of the second and/or third guide assembly, and the blades of the second and third guide assembly are arranged substantially aligned with each other in relation to the first or second rotation axis.

Although the blades can be of any suitable shape to allow their function of passing and locking the banknotes, according to a preferred embodiment, each blade of the first set of guides defines laterally a substantially triangular shape.

In particular, preferably each blade of the first guide assembly defines laterally a substantially right triangle shape, and the first rotation axis is arranged at the right angle defined by said right triangle, and the second rotation axis is arranged at an angle defined by said right triangle which is not the right angle.

Furthermore, the banknote guiding device in accordance with the present invention comprises only two actuators, a first actuator acting jointly on the first and second guide assemblies, and a second actuator acting only on the third guide assembly.

Because of these features, as indicated above, the banknote guiding device according to the present invention is simpler than those using three rotation axes.

In addition, thanks to these two rotation axes, the guide assemblies can be positioned so as to minimize the gaps between the guide assemblies, avoiding jamming of the banknotes during their movement.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

For a better understanding of what has been set out, some drawings are included in which, schematically and only as a non-limitative example, a practical case of embodiment is represented.

DETAILED DESCRIPTION

Figure 1:
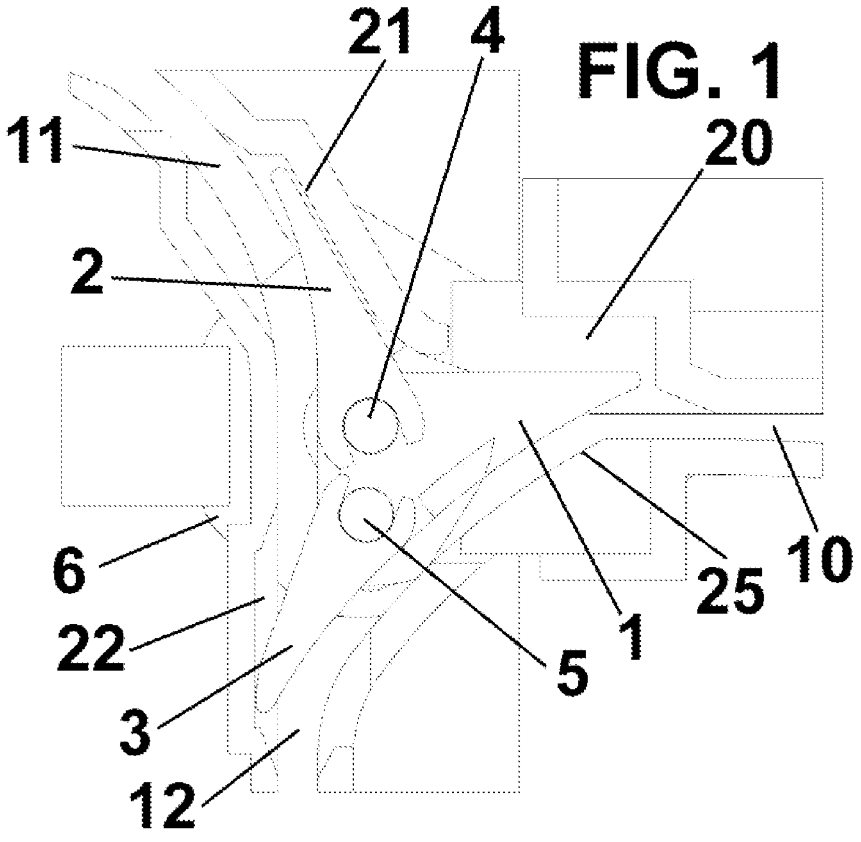
FIGS. 1 to 4 are side elevation section views of the banknote guiding device according to the present invention, in four different positions.

A description of example embodiments follows.

The teachings of all patents, published applications and references cited herein are incorporated by reference in their entirety.

As shown in the figures, the banknote guiding device in accordance with the present invention comprises a first, second and third guide assemblies 1, 2, 3, which are rotary to be placed in a first position or a second position for guiding the banknotes.

These guide assemblies 1, 2, 3 are rotary about a first and second rotation axis 4, 5. In particular, the first and second guide assemblies 1, 2 are rotary about a first rotation axis 4, and the third guide assembly 3 is rotary about a second rotation axis 5.

As can be seen in the figures, the second rotation axis 5 is mounted on the first guide assembly 1.

Figure 5:
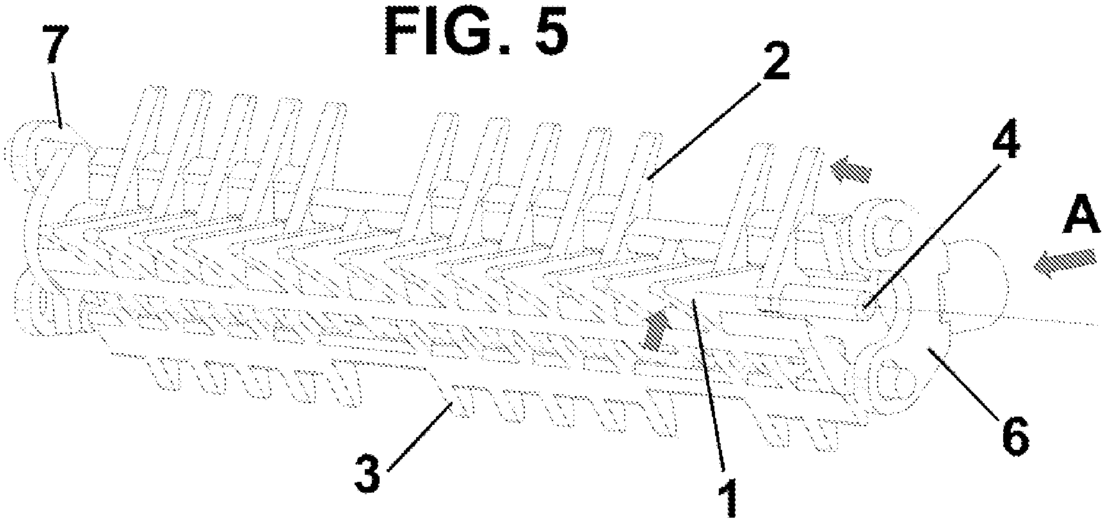
FIGS. 5 and 6 are perspective views from two different sides, showing the staggered arrangement of the three guide assemblies of the banknote guiding device in accordance with the present invention.
Figure 6:
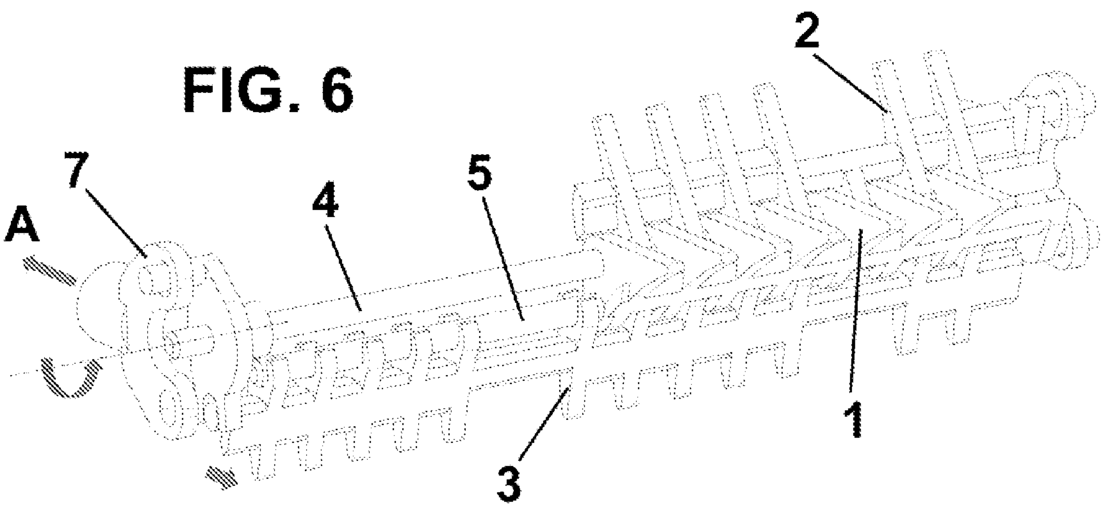

It should be noted that, as shown in FIGS. 5 and 6, each guide assembly 1, 2, 3 comprises a plurality of blades placed along its respective rotation axis 4, 5, the number of blades being appropriate to perform the function of allowing or blocking the passage of a banknote. It should be noted that in FIG. 6 a portion of the guide assemblies has been cut out to show the position of the rotation axes 4, 5.

Furthermore, said blades of different guide assemblies 1, 2, 3 are arranged in a staggered manner, i.e. the blades of the first guide assembly 1 are arranged between the blades of the second 2 and/or third 3 guide assembly.

According to the embodiment shown in FIGS. 5 and 6, the blades of the second 2 and third 3 guide assembly are arranged substantially aligned with each other in relation to the first 4 or second 5 rotation axis.

Obviously, the shape of the blades of the guide assemblies is any shape suitable for performing their function, but according to the embodiment shown in the figures, each blade of guide assemblies 1, 2, 3 defines laterally a substantially triangular shape.

For example, each blade of the first guide assembly 1 defines laterally a substantially right triangle shape, with the first rotation axis 4 arranged at the right angle defined by that right triangle, and the second rotation axis 5 arranged at an angle defined by that right triangle that is not the right angle.

For example, the second and third guide assemblies 2 and 3 define laterally a triangle shape, with the first rotation axis 1 being on the shortest side of the triangle, and the third guide assembly 3 with the second turning axis 5 being on the shortest side of the isosceles triangle.

The banknote guiding device in accordance with the present invention is arranged at a connection point between three banknote channels, indicated by reference numbers 10, 11 and 12 in FIGS. 1 to 3, so that the banknotes will be guided along one of those three paths, as explained below.

In FIG. 1, the positions of the guide assemblies are as follows:

- the first guide assembly 1 is in its first position, which closes the communication of the first channel 10 with the second channel 11 and opens the communication of the first channel 10 with the third channel 12;
- the second guide assembly 2 is in its first position, which closes the communication of the second channel 11 with the first channel 10 and opens the communication of the second channel 11 with the third channel 12, although in this figure the position of the second guide assembly 2 is not relevant;
- the third guide assembly 3 is in its first position, which opens the communication of the third channel 12 with the first channel 10 and closes the communication of the third channel 12 with the second channel 11.

It should be noted that the banknote guiding device in accordance with the present invention comprises only two actuators: a first actuator 6 acts jointly on the first and second guide assemblies 1 and 2, and a second actuator 7 acts on the third guide assembly 3.

Although the actuators can have any suitable configuration, according to the shown embodiment, the actuators 6, 7 comprise a U-shaped plate provided with holes at their ends, whose displacement in the direction A (perpendicular to the longitudinal axis of the rotation axes 4, 5) causes the change of position of the guide assemblies 1, 2, 3.

The banknote is guided between the first channel 10 and the third channel 12, or vice versa, as the channel is bi-directional, i.e. the banknote can be moved in one direction or in the opposite direction.

Figure 2:
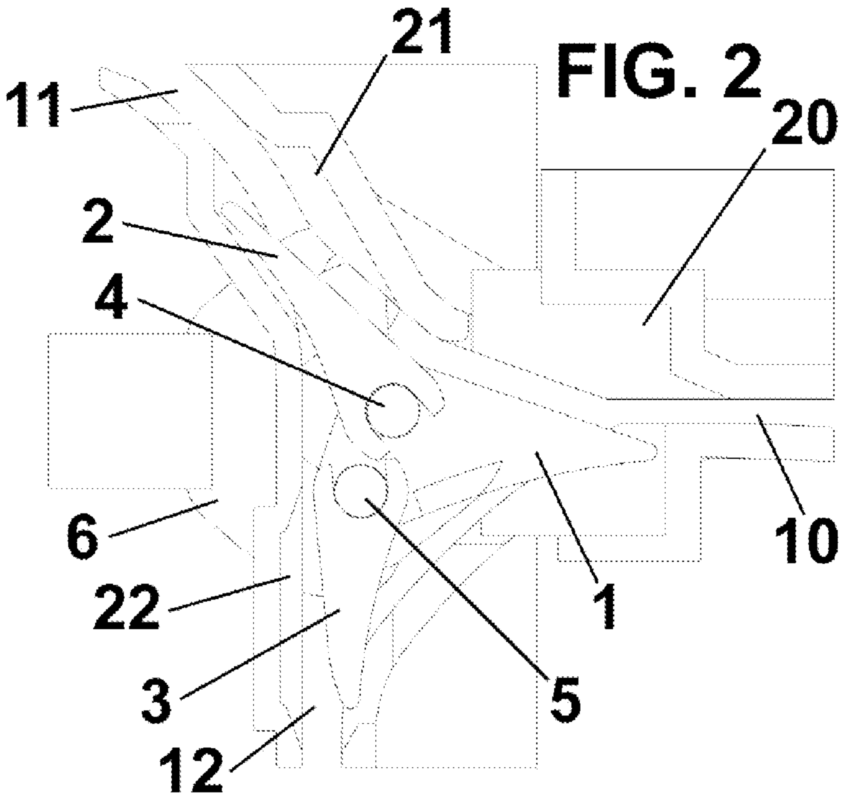

In FIG. 2, the positions of the guide assemblies are as follows:

- the first guide assembly 1 is in its second position, which opens the communication of the first channel 10 with the second channel 11 and closes the communication of the first channel 10 with the third channel 12;
- the second guide assembly 2 is in its second position, which opens the communication of the second channel 11 with the first channel 10 and closes the communication of the second channel 11 with the third channel 12;
- the third guide assembly 3 is in its second position, which closes the communication of the third channel 12 with the first channel 10 and opens the communication of the third channel 12 with the second channel 11, although in this figure the position of the third guide assembly 3 is not relevant.

In these positions, the banknote is guided between the first channel 10 and the second channel 11, or vice versa, as the channel is bi-directional.

Figure 3:
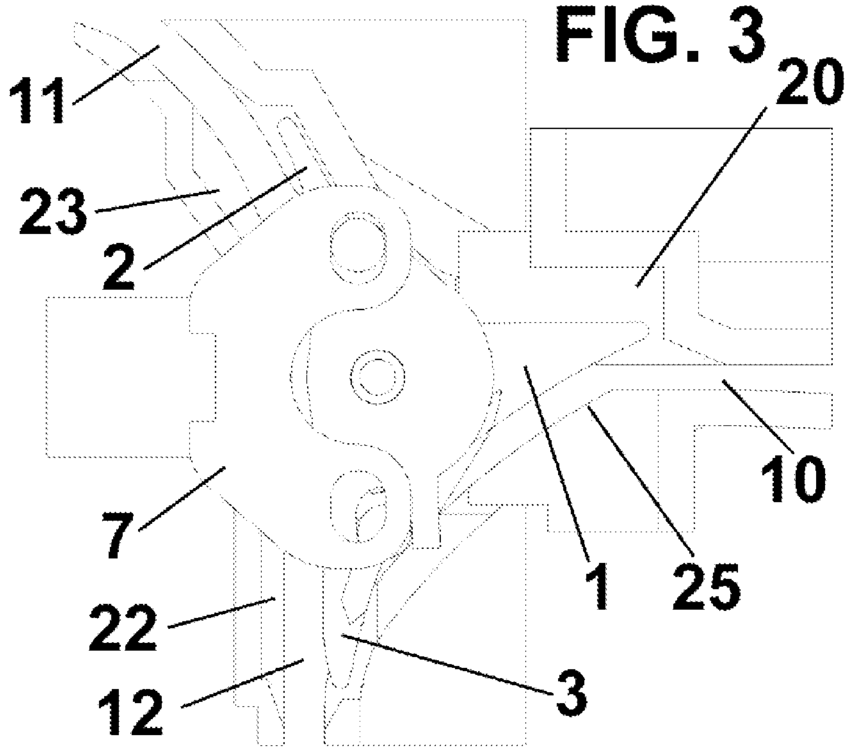

In FIG. 3, the positions of the guide assemblies are as follows:

- the first guide assembly 1 is in its first position, which closes the communication of the first channel 10 with the second channel 11 and opens the communication of the first channel 10 with the third channel 12, although in this figure the position of the third guide assembly 3 is not relevant;
- the second guide assembly 2 is in its first position, which closes the communication of the second channel 11 with the first channel 10 and opens the communication of the second channel 11 with the third channel 12;
- the third guide assembly 3 is in its second position, which closes the communication of the third channel 12 with the first channel 10 and opens the communication of the third channel 12 with the second channel 11.

In these positions, the banknote is guided between the second channel 11 and the third channel 12, or vice versa, as the channel is bi-directional.

Figure 4:
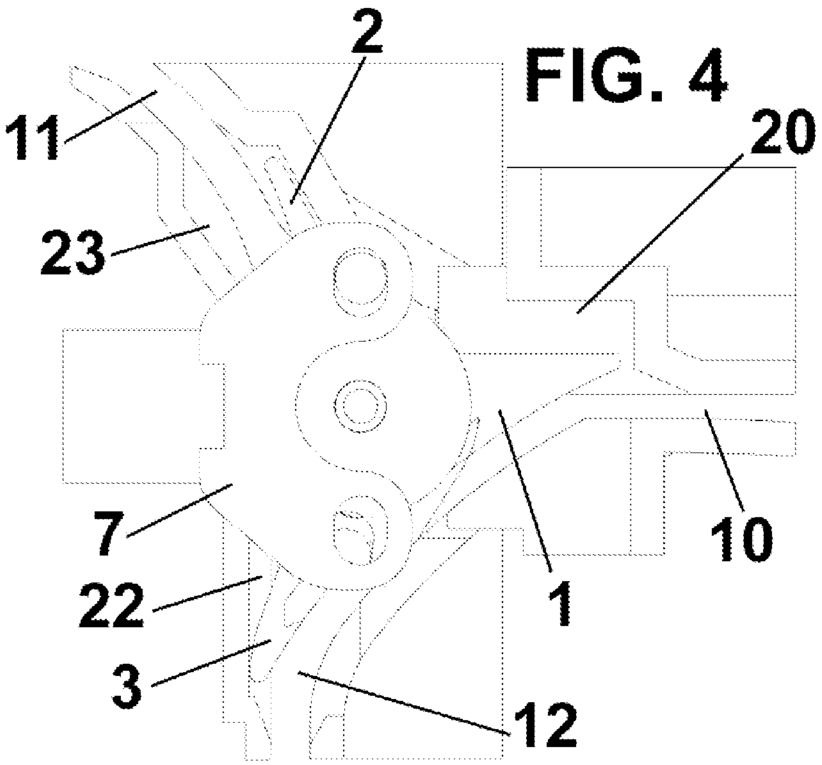

The position of guide assemblies 1, 2, 3 in FIG. 4 is the same as in FIG. 1, and this figure is provided to show the difference in the position of the second actuator 7.

It should be noted that in channels 10, 11, 12 cavities are defined, where the distal ends of the blades of the guide assemblies are placed in their positions.

In particular, the blades of the first guide assembly 1 are placed in a first cavity 20 or a second cavity 25 in their first and second positions, respectively.

The blades of the second guide assembly 2 are placed in a third cavity 21 or a fourth cavity 23 in their first and second positions, respectively.

The blades of the third guide assembly 3 are placed in a fifth cavity 22 or a sixth cavity 24 in their first and second positions, respectively.

In relation to these cavities, it should be indicated that they are cavities into which the blades enter, preferably in the form of grooving and tonguing.

Despite the fact that reference has been made to a specific embodiment of the invention, it is clear to a person skilled in the art that the described banknote guiding device is susceptible to numerous variations and modifications, and that all the details mentioned can be replaced by other technically equivalent ones, without departing from the scope of protection defined by the attached claims.

While example embodiments have been particularly shown and described, it will be understood by those skilled in the art that various changes in form and details may be made therein without departing from the scope of the embodiments encompassed by the appended claims.

What is claimed is:

1. A banknote guiding device, comprising: first, second and third guide assemblies, each guide assembly being rotary to be placed in a first or second position for guiding banknotes into channels, and wherein these channels are bi-directional, and the first and second guide assemblies are rotary about a first rotation axis, and the third guide assembly is rotary about a second rotation axis, and wherein the second rotation axis coincides with the first guide assembly and in that the first guide assembly comprises a first plurality of blades placed along the first rotation axis, the second guide assembly comprises a second plurality of blades placed along the first rotation axis, and the third guide assembly comprises a third plurality of blades placed along the second rotation axis, further comprising two actuators: a first actuator acting jointly on the first and second guide assemblies, and a second actuator acting on the third guide assembly, the actuators comprising a U-shaped plate provided with holes at their ends, whose displacement in a direction perpendicular to the longitudinal axis of the rotation axes causes the change of position of the guide assemblies, wherein each blade of the first guide assembly defines laterally a substantially triangular shape, wherein each blade of the first guide assembly defines laterally a substantially right-angled shape, and wherein the second rotation axis is arranged at an angle defined by that right triangle which is not the right angle.

2. The banknote guiding device according to claim 1, wherein the blades of the first guide assembly are arranged between the blades of the second and/or third guide assembly.

3. The banknote guiding device according to claim 2, wherein the blades of the second and third guide assembly are substantially aligned with each other in relation to the first or second rotation axis.

4. The banknote guiding device according to claim 1, wherein the first rotation axis is arranged at the right angle defined by this right triangle.

5. The banknote guiding device according to claim 1, wherein each guide assembly comprises a plurality of blades placed along their respective rotation axis.

6. The banknote guiding device according to claim 5, wherein the blades of the first guide assembly are arranged between the blades of the second and/or third guide assembly.

7. The banknote guiding device according to claim 6, wherein the blades of the second and third guide assembly are substantially aligned with each other in relation to the first or second rotation axis.

8. The banknote guiding device according to claim 5, wherein the blades of the second and third guide assembly are substantially aligned with each other in relation to the first or second rotation axis.

9. The banknote guiding device according to claim 5, wherein the first rotation axis is arranged at the right angle defined by this right triangle.

* * * * *